(12) United States Patent
Ballinger et al.

(10) Patent No.: US 6,405,839 B1
(45) Date of Patent: Jun. 18, 2002

(54) DISC BRAKE ROTOR

(75) Inventors: Robert S. Ballinger, West Chester; Kenneth B. Dunlap, Springfield; Michael A. Riehle, West Chester, all of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/754,691

(22) Filed: Jan. 3, 2001

(51) Int. Cl.[7] .............................................. F16D 65/10
(52) U.S. Cl. ......................... 188/218 XL; 188/264 AA
(58) Field of Search ...................... 188/218 XL, 264 A, 188/264 AA, 71.6, 73.2, 58, 59, 18 R, 18 A, 218 A; 192/113.2, 113.23, 113.26

(56) References Cited

U.S. PATENT DOCUMENTS

| 4,523,666 | A | * | 6/1985 | Murray | 188/218 XL |
| 4,638,891 | A | * | 1/1987 | Wirth | 188/58 |
| 5,878,848 | A | * | 3/1999 | Zhang | 188/218 XL |
| 6,053,290 | A | * | 4/2000 | Goddard | 188/218 XL |
| 6,145,636 | A | * | 11/2000 | Ikari et al. | 188/218 XL |

FOREIGN PATENT DOCUMENTS

JP    58-221026 A    * 12/1983

* cited by examiner

Primary Examiner—Pam Rodriguez
(74) Attorney, Agent, or Firm—Scott A. McBain

(57) ABSTRACT

A disc brake including a pair of friction plates arranged coaxially in a parallel, spaced-apart relationship and a plurality of vanes extending between the pair of friction plates, each of the vanes having a proximal end, a distal end and a mid-portion extending between the proximal end and the distal end, at least one of the distal end and the proximal end of at least half the vanes having a first cross-sectional area, the mid-portion having a second cross-sectional area, the first cross-sectional area being substantially greater than the second cross-sectional area. The vanes can include a T-shaped portion adjacent the distal end. The vanes can include an hourglass shaped portion. The vanes may taper from the distal end to the proximal end. The vanes can include a thicker cross-section adjacent a peripheral portion of the rotor.

20 Claims, 4 Drawing Sheets

DISC BRAKE ROTOR

TECHNICAL FIELD

The present invention relates generally to disc brake rotors as used in a vehicle braking system. More particularly, the invention relates to a vehicle brake rotor that incorporates a plurality of vanes designed to reduce noise generated in the brake system.

BACKGROUND OF THE INVENTION

Noise generated during a brake application has been increasing as the size of vehicles has been decreasing. Attempts have been made to reduce the noise generated using various systems and methods. One such technique involves the use of sound adsorption coatings on the pad assembly. While such coatings have some effectiveness, the addition of the coating adds cost to the manufacture and at times, undesirable noise occurs when the thickness of the coating has not been uniform.

Another technique involves a disc brake pad assembly having clench tabs extending through rubber-like grommets in openings in a caliper housing leg so that the grommets are retained in the openings and the brake pad assembly is retained on the housing leg. The grommets provide a noise damping action during braking to reduce noise.

Individual noise problems have been reduced through the modification of the ingredients in the composition of materials that make up a brake pad. In many of these cases, while noise may have been abated somewhat, the braking effectiveness of the system has been changed by the modification of the brake pad material. Still another technique of reducing brake noise involves affixing a ring damper about a periphery of a brake rotor in a disc brake system. The ring damper is held in place by a groove formed in the periphery of the disc and is pre-loaded against the rotor both radially and transversely.

The above techniques involve the reduction of noise by absorbing or masking the noise after it has been created or by adding costly complexity to the braking system. It would be advantageous to design the system to reduce the potential for the creation of noise. It has been suggested that much of brake squeal or noise is influenced by the excitation of the natural frequencies of a rotor caused by the rubbing of friction pads on a rotor surface. There is evidence that a disc brake rotor may have a dozen or more naturally occurring frequencies. While most of these are in the axial direction, others are in the torsional direction. In simulated braking applications only certain of these natural frequencies create brake noise or squeal. Every natural frequency of a vibrating system has associated with it a mode shape that describes the pattern of deformation associated with that natural frequency. In a continuous structure, the mode shape is generally accepted or described by defining the pattern of nodes (loci of points of zero deformation) on the surface of the structure. Experiments have shown that the mode shape of an annular circular plate, a shape like that of a brake rotor, consists of nodal circles and diameters. Thus, a beneficial effect on brake noise should be attainable if the nodal diameter modes of an installed disc rotor are maintained at a maximum separation, thereby reducing or eliminating coupling of the nodal diameter modes in the audible frequency range.

A typical structure of a brake rotor includes a central disc portion that is adapted to be mounted to an axle of a vehicle as in known in the art, by fasteners. An extending portion typically connects one of a pair of rotor friction plates or cheeks to the central disc portion. A plurality of vanes extend from an inner surface of the first plate to connect a second plate thereto. The vanes are typically arranged in a radial fashion about the rotor. The vanes hold the first and second plates in a parallel, side-by-side relationship. Typically, vanes have an overall regular elongate, rod, coffin or rectangular shape with a generally constant width and cross-sectional area. In other words, many current vanes start out a rectangular cross-section at one end and remain rectangular throughout the longitudinal distance of the vane at an opposite end. Similarly, a prior-art plate typically has a thickness or cross-section remaining substantially constant along the radial direction.

SUMMARY OF THE INVENTION

One aspect of the present invention provides a disc brake including a pair of friction plates arranged coaxially in a parallel, spaced-apart relationship and a plurality of vanes extending between the pair of friction plates, each of said vanes having a proximal end, a distal end and a mid-portion extending between the proximal end and the distal end, at least one of the distal end and the proximal end of at least half the vanes having a first cross-sectional area, the mid-portion having a second cross-sectional area, the first cross-sectional area being substantially greater than the second cross-sectional area.

In other aspects of the invention the cross-sectional area of the distal end of at least half the vanes can be substantially greater than the cross-sectional area of the mid-portion. The cross-sectional area of the distal end of at least half the vanes can be about 50 percent greater than the cross-sectional area of the mid-portion. The cross-sectional area of the distal end of all of the vanes can be substantially greater than the cross-sectional area of the mid-portion. The cross-sectional area of the distal end of all of the vanes is substantially greater than the cross-sectional area of the mid-portion.

Another aspect of the present invention provides a rotor for a disc brake having a plurality of first vanes alternated with a plurality of second vanes, the first and second vanes both having distal and proximal ends, the distal and proximal ends connected by an extending mid-portion. A cross-sectional area of the mid-portion of the first vanes can be substantially greater than a cross-sectional area of the proximal end. A cross-sectional area of the distal end of the first vanes can be substantially greater than the cross-sectional area of the mid-portion. A cross-sectional area of the mid-portion of the second vanes can be substantially less than a cross-sectional area of both the distal and proximal ends.

Another aspect of the present invention provides a rotor for a disc brake including a mid-portion having a substantially constant longitudinal cross-sectional area. The mid-portion of the vanes can have a narrow portion adjacent the proximal end of the vanes having a cross-sectional area less than that of a portion extending outwardly from the narrow portion of the mid-portion of the vanes.

Another aspect of the present invention provides a rotor for a disc brake including a pair of friction plates arranged coaxially in a parallel, spaced-apart relationship and a plurality of vanes extending between the pair of friction plates, each of the vanes having a proximal end, a distal end and a mid-portion extending between the proximal end and the distal end, at least half of the vanes including a T-shaped portion adjacent the distal end of the vanes.

Other aspects of the present invention provide a rotor wherein all of the vanes include a T-shaped portion adjacent the distal end of the vanes. Half of the vanes of the rotor including a T-shaped portion can include an additional inverse T-shaped portion adjacent the proximal end of the vanes. The T-shaped portion can be at least 50% wider than a width of the mid-portion. Each vane can include an angled portion located between the T-shaped portion and the mid-portion. In an alternate aspect of the present invention all of the vanes can include a T-shaped portion adjacent each respective distal end.

Another aspect of the present invention provides a rotor wherein each of the pair of friction plates includes a chamfer on an inner surface of each friction plate, the chamfer being located adjacent the periphery of the rotor, the vanes being thicker at the chamfer to extend between the pair of plates.

Another aspect of the present invention provides a rotor for a disc brake including a pair of friction plates arranged coaxially in a parallel, spaced-apart relationship and a plurality of vanes extending between the pair of friction plates, each of said vanes having a proximal end, a distal end and a mid-portion extending between the proximal end and the distal end, at least half of the vanes including an hourglass shaped portion.

Other aspects of the invention provide a rotor where the hourglass shaped portion extends along an entire length of the vanes. The hourglass shaped portion can extend from the mid-portion to the distal end of the vanes. Half of the vanes can include an hourglass shaped portion extending along an entire length of the vanes and the other half of the vanes include an hourglass shaped portion extending from a mid-portion to a distal end of the vanes. A width of the vanes can taper from a distal end along a mid-portion of the vanes at a location adjacent the friction plates. A central portion of the vanes located halfway between the friction plates can have a constant width from the distal end along the mid-portion of the vanes. Each of the vanes can include an increased draft portion having a first thickness located adjacent the distal end of each vane and a second thickness at a mid-portion of each vane, the first thickness being greater than a second thickness.

An aspect of the present invention includes a method of reducing noise in a disc brake rotor including stiffening a radially outer portion of the brake rotor with an outer portion of a plurality of vanes and reducing coupling of nodal diameter modes in an audible frequency range. The outer portion of the plurality of vanes can include a T-shaped portion.

Another aspect of the invention includes a rotor for a disc brake including means for stiffening a radially outer portion of the brake rotor with an outer portion of a plurality of vanes and means for reducing coupling of nodal diameter modes in an audible frequency range. The outer portion of the brake rotor can include a T-shaped portion.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DESCRIPTION OF THE PREFERRED EMBODIMENT

Figure 1:
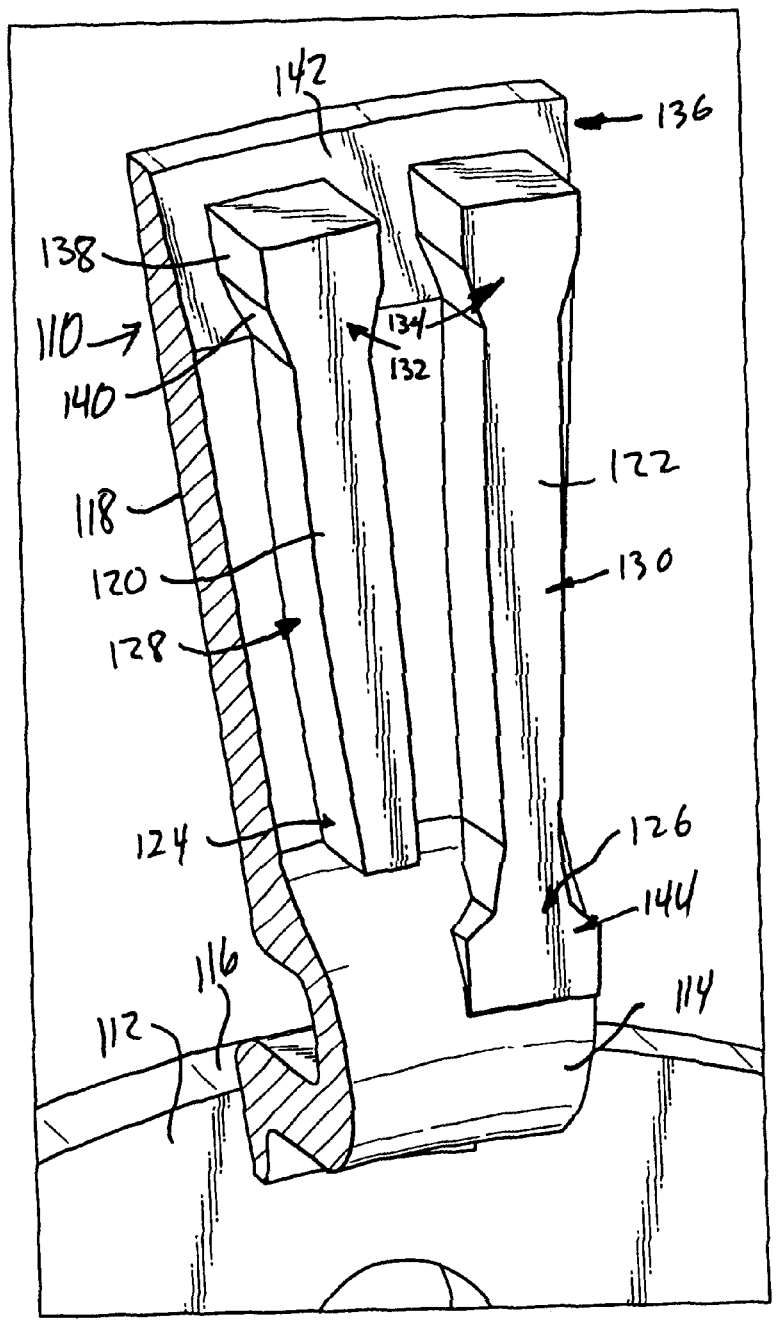
FIG. 1 illustrates an embodiment of a brake rotor of the present invention having T-shaped vanes.
Figure 2:
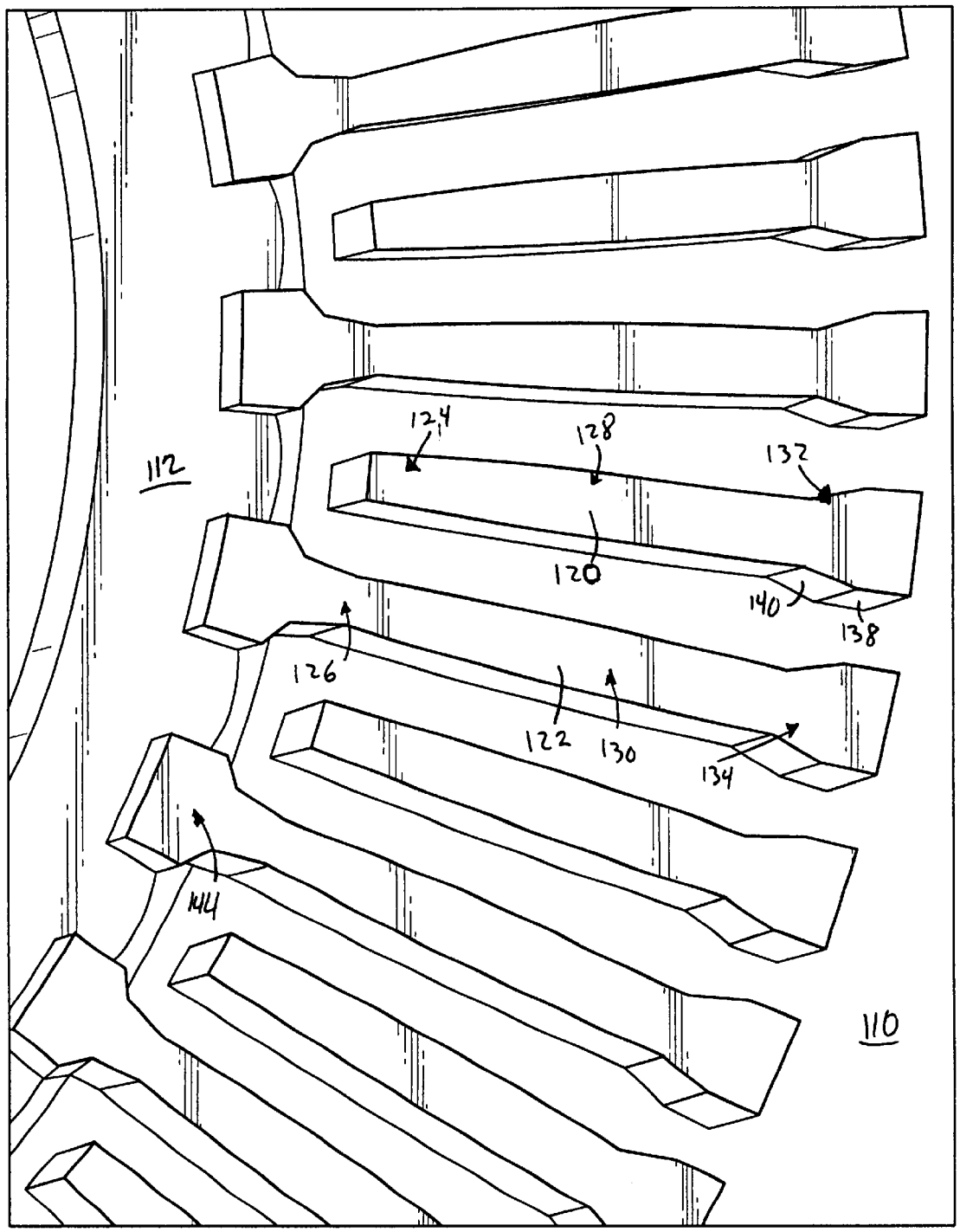
FIG. 2 illustrates an alternating arrangement of the vanes in the brake rotor of FIG. 1.

Referring to FIGS. 1 and 2, one embodiment of a brake rotor is generally shown at numeral 110. The brake rotor 110 includes a central attachment portion 112. An extending portion 114 is attached adjacent to the periphery 116 of the central attachment portion 112. A first friction plate 118 (one of a pair of parallel friction plates) is depicted attached to the central attachment portion 112 by the extending portion 114. A second friction plate (not shown), which would be oriented in a parallel, spaced apart relationship to the first plate 118 is omitted to show the structure therebetween. A plurality of vanes 120, 122 is provided that extend between the plates and are arranged in a radial fashion. The vanes 120, 122 are radial members, each having a proximal end 124, 126 adjacent the extending portion 114 and a middle span or mid-portion 128, 130 that extends longitudinally in a radial direction to a distal end 132, 134. The distal end 132, 134 is located adjacent the outer periphery 136 of the friction plates.

In one embodiment, a first and a second set of vanes 120, 122 are provided between the plates in an alternating arrangement. In other words, a first vane 120 is followed by an adjacent second vane 122, which is followed by a first vane 120 and so on, around the rotor 110. Each of the first set of vanes 120 has a T-shape configuration. The top of the T portion 138 is located in the distal end 132 of the vane 120. The middle span 128 of the vane 120 is essentially a longitudinally extending rectangular portion. The vane 120 includes an angled portion 140 between the middle span 128 and the T-shaped portion 138. The T portion 138 of the vane 120 can have a width about 50% greater than that of the middle span 128 of the first vane 120. The T portion 138 of each vane 120 can have a width about twice that of the middle span 128 of the first vane 120. Also, the cross-sectional area of portion 138 can be made from about 50% greater to about twice that of the middle span 128 of the first vanes 120. In this embodiment, the inner peripheral edges of the plates can be chamfered. As a result of the chamfered portion 142, the thickness of the vane 120, i.e., the distance between the friction plates, at the distal end 132 is greater than at the mid-portion 128 and proximal end 124 of the vane 120.

Arranged in an alternate fashion with the first vanes 120 is a set of second vanes 122. The second vanes 122 include the T-shaped configuration of the distal portion of the first vanes 120. However, the second vanes 122 each can include an I-shaped configuration. The proximal end 126 of each of the vanes 122 has a wide portion 144 similar to the wide portion of the distal end 134. It is believed that the widened portion or T-shaped 120 and I-shaped vanes 122 adds mass and stiffness to the outer periphery (and inner periphery in the case of the I-shaped vanes) of the rotor 110 and thus, compared to a prior art rotor, has a beneficially modified pattern of nodal resonance modes.

Figure 3:
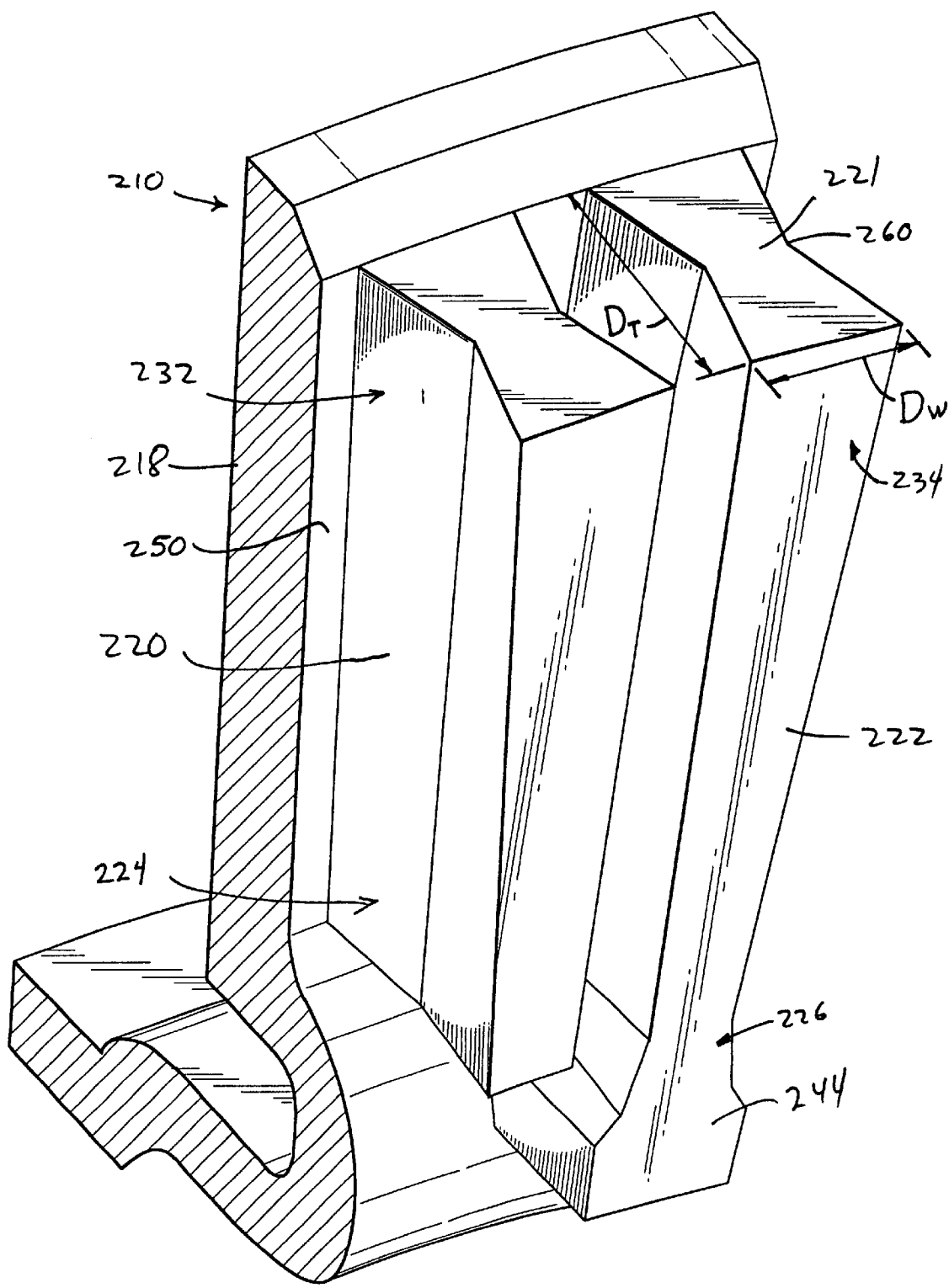
FIG. 3 illustrates a second embodiment of a brake rotor of the present invention having hourglass and I-shaped vanes with an expanding thickness along a longitudinal direction.

Referring to FIG. 3, another embodiment of the brake rotor is generally shown at 210. In this illustration it can be seen that the vanes 220, 222 have an hourglass shape. The hourglass shape can be seen in the distal exposed end section shown at 221. At a mid-point 260 of the thickness $D_T$ of each vane 220, 222, i.e., halfway between the plates, the longitudinal cross-section (not shown) can be rectangular or a constant thickness from a proximal portion 224, 226 to a distal portion 232, 234. However, the vanes 220, 222 each can taper inwardly toward their proximal ends 224, 226 where the vanes contact the inner surface 250 of the friction plate 218. Thus, the vanes are wider ($D_W$) adjacent the plate surface at the distal ends 232, 234 of the vanes 220, 222. The shape of the area defined between the vanes on the rotor inner plate surface 250 can be rectangular as a result of the taper of the vanes 220, 222.

The second set of vanes 222 can be alternated between the first set of vanes 220. The second set of vanes 222 can be similar to the first vanes 220 with the addition of an inverted T-shaped portion adjacent the proximal end 226 of vane 222. It is believed that the hourglass-shaped cross-section of the vanes 220, 222 and the inverted T-shaped portion 244 adds mass and stiffness to the outer periphery (and inner periphery in the case of the inverted T-shaped vanes) of the rotor 210 and thus, compared to a prior art rotor, has a beneficially modified pattern of nodal resonance modes.

Figure 4:
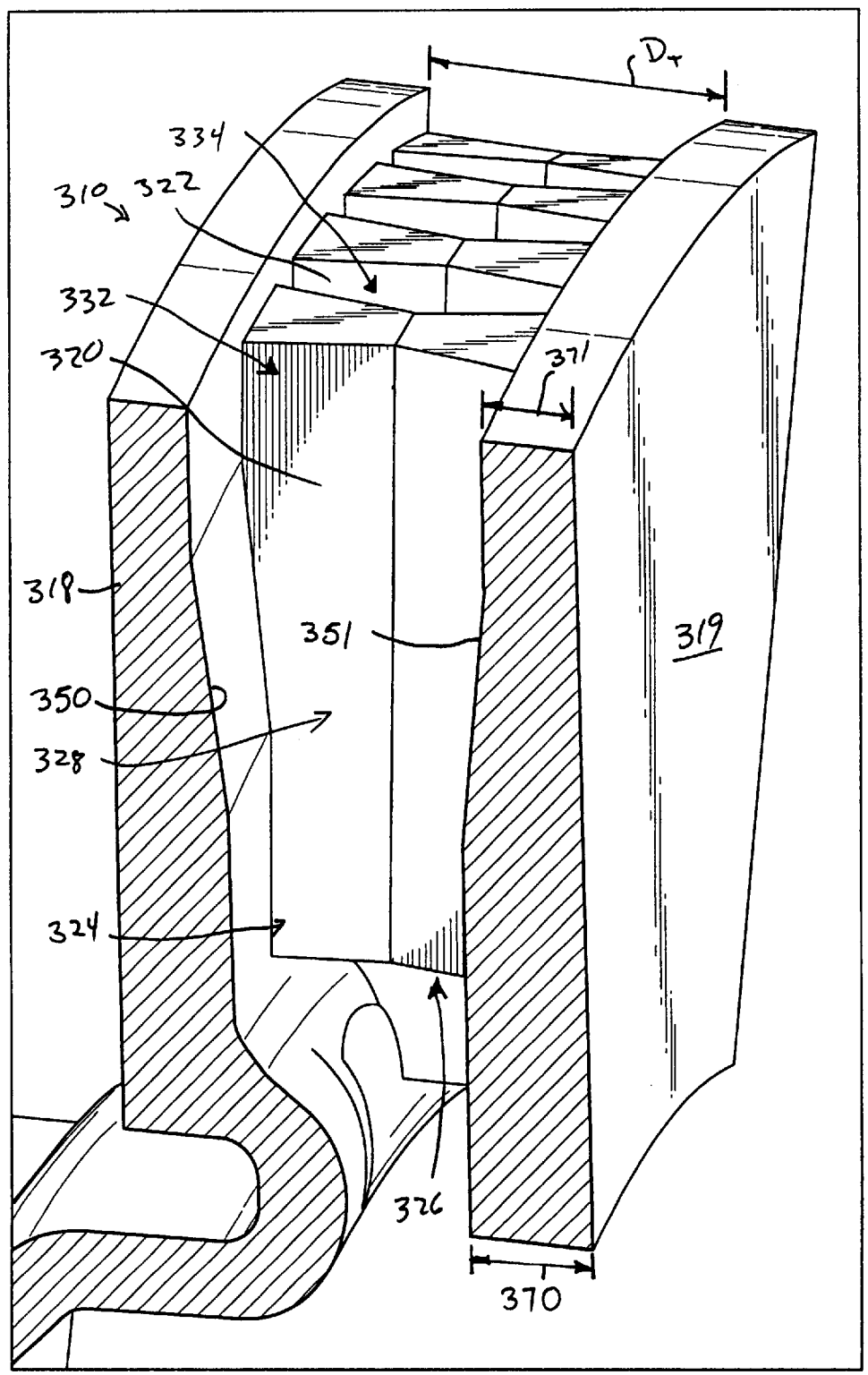
FIG. 4 illustrates a third embodiment of a brake rotor of the present invention having variable draft vanes.

FIG. 4 illustrates another embodiment of the rotor 310 of the present invention. The first and second vanes 320, 322 of the embodiment shown in FIG. 4 are similar to those shown in FIG. 3 with the exception of the use of variable draft vanes 320, 322. The inside surfaces 350, 351 of the first and second friction plates or cheeks 318, 319 in FIG. 4 are tapered toward the outer periphery of each plate. In this manner, the rotor 310 shown can beneficially minimizes a temperature gradient from the rotor inner thickness or diameter, generally shown at 370, to the rotor outer diameter, generally shown at 371. Each vane extends a greater distance $D_T$ between the plates 318, 319 at the outer periphery of the rotor 371. Thus, the distal ends 332, 334 of the vanes 320, 322 each have a greater thickness in a plane extending in the direction of the thickness $D_T$, than at a proximal 324, 326 or middle portion of each of the vane.

Each of a first set of hourglass vanes 320 has a longitudinal, generally rectangular shape with a gradual taper toward the proximal end 324 adjacent the friction plates 318, 319. The first vanes 320 are alternated with second vanes 322. Each second vane 322 has a longitudinally oriented inverted T-shape. Each of the vanes 322 has an hourglass shape in a cross-section of the middle 328 (of vane 320) and distal portions 332, 334. Each of the second vanes 322, at a proximal end 334, has an angled portion that widens to a T-shaped portion of the vane like that shown in FIG. 3.

During use, the rotor generates a large number of nodal diameter modes. Each of the nodal diameter modes generates a different pattern of resonant rotor vibration. When the nodal diameter modes converge or couple, noise is often produced. Also, the location of the highest strain energy for the nodal diameter nodes is at the extreme outside diameter on the rotor. In operation, the present invention provides vanes that, as a result of the vane geometry, add stiffness to the rotor at the extreme outside diameter of the rotor. The increased stiffness of the outer diameter of the rotor tends to increase separation (spacing) of the nodal diameter nodes. This can reduce coupling of the nodal diameter modes. The increased separation and reduction of the coupling of the nodal diameter nodes reduces the likelihood of the rotor producing noise in the audible frequency range during use.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A rotor for a disc brake comprising:
   a pair of friction plates arranged coaxially in a parallel, spaced-apart relationship; and
   a plurality of vanes extending between the pair of friction plates,
   the pair of friction plates including a chamfered portion on an inner surface of each respective friction plate, the chamfered portion being located adjacent the periphery of the rotor, the vanes being thicker at the chamfered portion to extend between the pair of plates.

2. The rotor of claim 1 wherein each of said vanes includes a proximal end, a distal end and a mid-portion extending between the proximal end and the distal end, a distal end of a plurality of the plurality of vanes including a first cross-sectional area, the mid-portion including a second cross-sectional area, the first cross-sectional area being substantially greater than the second cross-sectional area.

3. The rotor of claim 2 wherein the first cross-sectional area of at least half the vanes is substantially greater than the second cross-sectional area.

4. The rotor of claim 3 wherein the first cross-sectional area of at least half the vanes is about 50 percent greater than the second cross-sectional area.

5. The rotor of claim 2 wherein the first cross-sectional area of all of the vanes is substantially greater than the second cross-sectional area.

6. A rotor for a disc brake comprising:
   a pair of friction plates arranged coaxially in a parallel, spaced-apart relationship; and
   a plurality of vanes extending between the pair of friction plates, each of said vanes having a proximal end, a distal end, and a mid-portion extending between the proximal end and the distal end, the distal end of a plurality of the plurality of vanes including a first cross-sectional area, the mid-portion including a second cross-sectional area, the first cross-sectional area being substantially greater than the second cross-sectional area, the plurality of the plurality of vanes having a T-shaped portion adjacent the distal end of the vanes.

7. The rotor of claim 6 wherein all of the vanes include a T-shaped portion adjacent the distal end of the vanes.

8. The rotor of claim 7 wherein half of the vanes include an inverse T-shaped portion adjacent the proximal end of the vanes.

9. The rotor of claim 7 wherein the T-shaped portion is at least 50% wider than a width of the mid-portion.

10. The rotor of claim 7 wherein each vane includes an angled portion located between the T-shaped portion and the mid-portion.

11. The rotor of claim 7 wherein each of the pair of friction plates includes a chamfered,portion on an inner surface of each respective friction plate, the chamfered portion being located adjacent the periphery of the rotor, the vanes being thicker at the chamfered portion to extend between the pair of plates.

12. A rotor for a disc brake comprising:
   a pair of friction plates arranged coaxially in a parallel, spaced-apart relationship; and
   a plurality of hourglass shaped vanes extending between the pair of friction plates, each of said vanes having a proximal end, a distal end, and a mid-portion extending between the proximal end and the distal end, a distal end of a plurality of the plurality of vanes including a first cross-sectional area, the mid-portion including a second cross-sectional area, the first cross-sectional area being substantially greater than the second cross-sectional area.

13. The rotor of claim 12 wherein the vanes taper in a width direction from a distal end along a mid-portion of the vanes at a location adjacent the friction plates.

14. The rotor of claim 13 wherein a central portion of the vanes located halfway between the friction plates has a constant width from the distal end along the mid-portion of the vanes.

15. The rotor of claim 13 wherein each of the vanes include an increased draft portion having a first thickness located adjacent the distal end of each vane and a second thickness at a mid-portion of each vane, the first thickness being greater than a second thickness.

16. A method of reducing noise in a disc brake rotor having a plurality of vanes disposed between a pair of friction plates arranged coaxially a parallel spaced apart relationship, the method comprising:

stiffening a radially outer portion of the brake rotor with an outer portion of a plurality of vanes by chamfering an inner surface of each of the pair of friction plates adjacent the periphery of the rotor to form a chamfered portion of each of the friction plates, and thickening the vanes at the chamfered portion to extend between the pair of plates, to thereby reduce coupling of nodal diameter modes in an audible frequency range.

17. The method of claim 16 wherein each vane tapers inwardly from the outer portion of the plurality of the vanes.

18. A method of reducing noise in a disc brake rotor, the method comprising:

stiffening a radially outer portion of the brake rotor with an outer portion of a plurality of vanes having a T-shaped portion, to thereby reduce coupling of nodal diameter modes in an audible frequency range.

19. A rotor for a disc brake comprising:

means for stiffening a radially outer portion of the brake rotor with an outer portion of a plurality of vanes; and means for reducing coupling of nodal diameter modes in an audible frequency range;

the outer portion of the plurality of vanes including a T-shaped portion.

20. The rotor of claim 19 wherein the plurality of vanes taper inwardly from the outer portion of the plurality of the vanes.

* * * * *